455-608 AU 233
3,697,757

United States Patent [15] 3,697,757

Stone [45] Oct. 10, 1972

[54] ARRANGEMENTS FOR DETECTING DISTORTED OPTICAL PULSES USING A CORRELATION TECHNIQUE

[72] Inventor: Julian Stone, Rumson, N.J.

[73] Assignee: Bell Telephone Laboratories, Incorporated, Murray Hill, Berkeley Heights, N.J.

[22] Filed: Feb. 8, 1971

[21] Appl. No.: 113,547

[52] U.S. Cl.....................................250/199, 235/181
[51] Int. Cl.............................................H04b 9/100
[58] Field of Search..250/119 Q, 116, 208, 209, 199; 235/181; 356/71; 325/41, 42, 65; 178/69; 333/18; 328/165

[56] References Cited

UNITED STATES PATENTS

| | | | |
|---|---|---|---|
| 3,582,635 | 6/1971 | Slobodin | 250/216 |
| 3,396,266 | 8/1968 | Max et al. | 250/219 Q |
| 2,897,351 | 7/1959 | Melton | 235/181 |
| 3,292,110 | 12/1966 | Becker et al | 333/18 |
| 3,328,583 | 6/1967 | Davison | 350/169 |

*Primary Examiner*—Robert L. Griffin
*Assistant Examiner*—Barry Leibowitz
*Attorney*—R. J. Guenther and Arthur J. Torsiglieri

[57] ABSTRACT

This application describes various arrangements for resolving a train of overlapping optical pulses. In each, a pilot pulse is used in conjunction with an information pulse train, to form a spatial pattern of cross-correlation functions of the information pulses. By selecting the time delay between adjacent pulses to be greater than the reciprocal of the pulse bandwidth, the correlation functions forming the aforesaid pattern are spatially resolvable. Thus, detection of each of the pulses of the train is realized by recording the peak of its corresponding correlation function.

11 Claims, 3 Drawing Figures

INVENTOR
J. STONE
BY
Sylvan Sherman
ATTORNEY

ARRANGEMENTS FOR DETECTING DISTORTED OPTICAL PULSES USING A CORRELATION TECHNIQUE

BACKGROUND OF THE INVENTION

This invention relates to the transmission of optical wave energy through time-invariant dispersive optical media and, more particularly, to a correlation arrangement for detecting pulses which, in and of themselves, are no longer resolvable as a result of passage through the aforesaid types of media.

As is well known, the transmission of an optical pulse train through a dispersive optical medium results in the distortion of the pulses. Such distortion, in many cases, is so severe that the individual pulses of the train, upon emergence from the medium, can no longer be resolved, in and of themselves. If the properties of the medium are time-invariant, at least during transmission of the train, then it is possible, in principle, to measure the distortion of a particular known input waveform. This information can then be used with the aid of correlation techniques to recompress the distorted pulses and thereby improve the resolvability of the pulses. However, except for the simplest types of dispersion, the aforesaid procedure is highly complex, since it necessitates, in each instance, a determination of the transmission properties of the particular medium being used, and construction of the appropriate filters or correlative devices.

It is, therefore, the principle object of the present invention to provide a correlation arrangement for improving the resolvability of a distorted train of pulses which is simple, automatic, and self-adjusting.

SUMMARY OF THE INVENTION

In accordance with the principles of the present invention, an optical pilot pulse is used, in conjunction with a train of otherwise nonresolvable overlapping optical pulses, to form a spatial pattern of cross-correlation functions of the pulses of the train. More particularly, by selecting the spacing between adjacent pulses to be greater than the reciprocal of the pulse bandwidth, the correlation functions in the aforesaid pattern are spatially separate and, therefore, resolvable. Thus, detection of each of the pulses of the train is realized by recording the peak of its corresponding correlation function.

DESCRIPTION OF THE DRAWINGS

The above and other features and aspects of the present invention will become more apparent upon consideration of the following detailed description taken in conjunction with the following drawings, in which.

DETAILED DESCRIPTION

Figure 1:
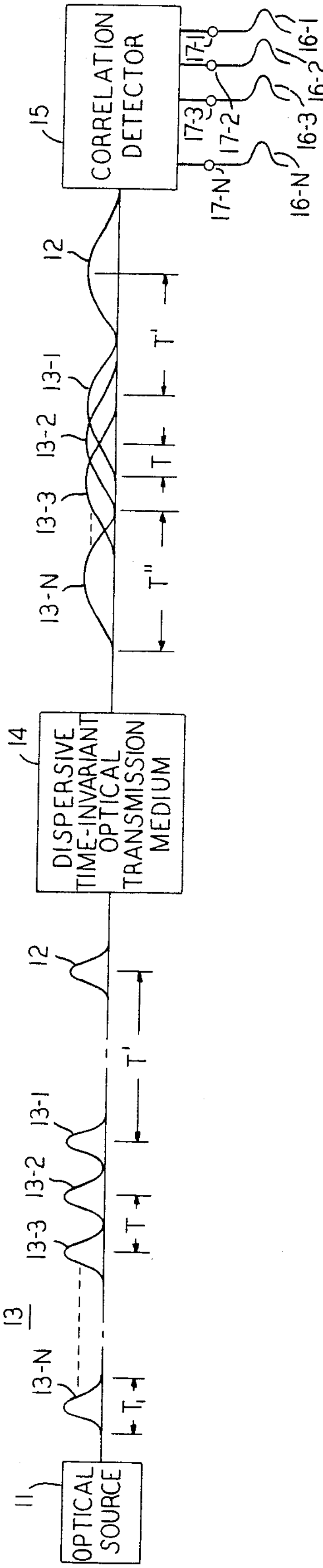
FIG. 1 is illustrative of an optical transmission system employing a correlation detector of the present invention.

In FIG. 1, an optical source 11 develops output optical wave energy comprising an optical pilot pulse 12 and a train 13' of optical information pulses 13–1 to 13–N, where all the pulses are identical. Each of the pulses is depicted, in FIG. 1, in terms of the envelope of its associated optical frequency oscillations. The center to center spacing (i.e., the time delay) between adjacent pulses of train 13' is equal to a time T where T is greater than the reciprocal of the pulse bandwidth $\alpha f$. Moreover, the width of each of the pulses 13 is equal to a time $T_1$, where $T_1$ is greater than or equal to $1/\Delta f$. In the instant illustrative example, it is assumed that $T_1=T$, and, therefore, that the pulses 13 do not overlap when generated by source 11. Also, as indicated, train 13' is delayed a time T' with respect to pilot pulse 12. Source 11, typically, can be a mode-locked He-Ne laser which is gated by an electrooptic switch to produce the required output pulse pattern. Alternatively, a pulsing Ga-As or Nd:YAG laser can be used.

The output optical wave energy derived from source 11 is coupled into the input end of a dispersive, time-invariant optical transmission medium 14. The latter medium, as a result of its dispersive properties, distorts the pilot pulse and the pulses of train 13' as they pass therethrough. Such distortion is evidenced by a substantial widening of each of the pulses to a pulse width T''. Thus, when coupled from the output end of medium 14, the pulses of the train are severely overlapped and, therefore, no longer resolvable, in and of themselves.

It is assumed, in this illustrative example, that the delay T' is equal to T''. Thus, pulses 12 and 13–1 are shown as just touching after they have passed through medium 14. Alternatively, T' can be greater than T''.

The distorted information pulse train 13' and the pilot pulse 12 are then coupled into a correlation detector 15, which is described in greater detail hereinbelow. Detector 15 utilizes distorted pilot pulse 12 and the similarly distorted information pulses to create a spatial pattern of resolvable correlation functions, each of which corresponds to a particular pulse of the train. Output electrical signals 16–1 to 16–N, coupled from detector output ports 17–1 to 17–N, correspond to the peaks of the correlation function and thus, in turn, to pulses 13–1 to 13–N, respectively. Hence detector 15 resolves the individual pulses of train 13' by sequentially producing a plurality of output signals, each one of which corresponds to a specific one of the pulses.

Figure 2:
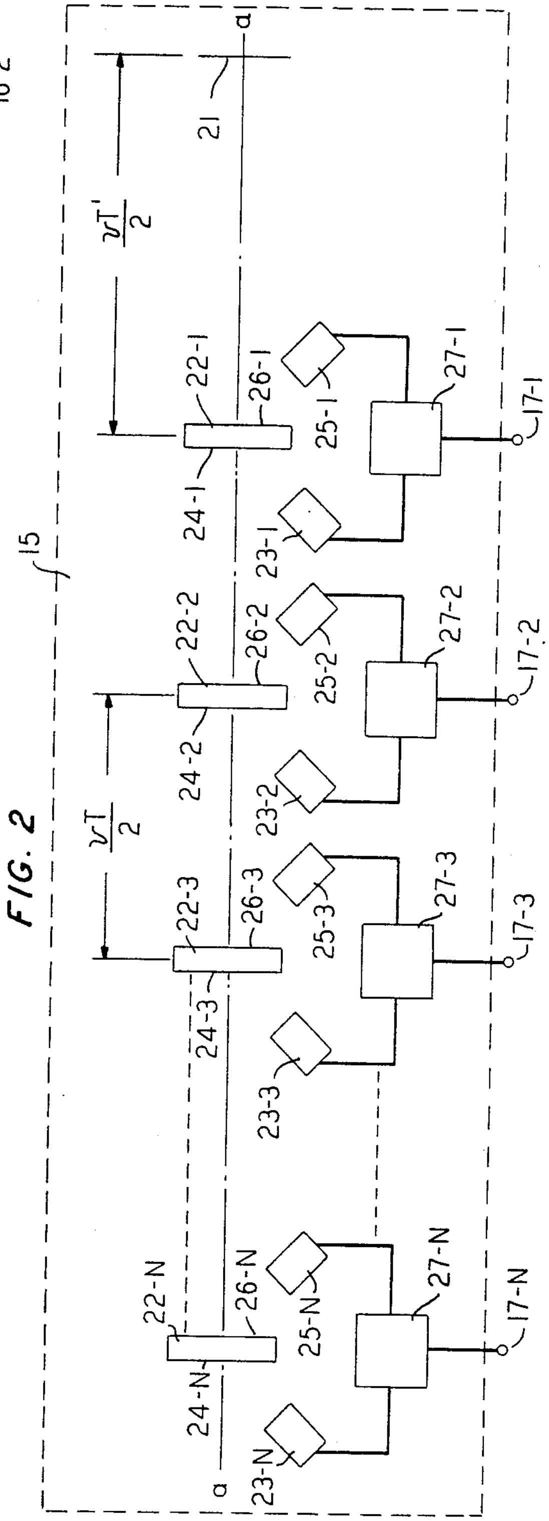
FIG. 2 shows in detail a correlation detector in accordance with the principles of the present invention.

FIG. 2 illustrates one embodiment of the detector 15 in accordance with the principles of the present invention. The detector comprises a mirror 21 aligned along a given axis *a*. Located in front of mirror 21, along axis *a*, are a plurality of longitudinally spaced quartz plates 22–1 to 22–N. The plates 22 are arranged such that adjacent plates are spaced a distance $vT/2$ apart, where $V$ is the velocity of the optical pulses, and $T$, as above-indicated, is the spacing between the pulses of train 13'. The plate closest to mirror 21, i.e., plate 22–1, is positioned along the axis such that its surface 26–1 is spaced a distance $vT/2$ away from the mirror. The thickness of each of the plates 22 is substantially equal to $m\lambda/4$ where $m$ is an odd integer and $\lambda$ is the wavelength of the optical wave. Advantageously, the parameter $m$ is selected such that the thickness of each plate is small (i.e., less than 3 percent) relative to $v/\Delta f$. Opposite parallel surfaces 24 and 26 are coated with an antireflection coating such that their roughness is mall relative to the optical wavelength, but sufficiently large to cause some scattering of optical energy. Advantageously a pulse which has traveled through all the plates does not suffer more than a 10 percent attenuation as a result of the total scattering caused by the plates' surfaces.

A first plurality of optical detectors 23–1 to 23–N are arranged to face surfaces 24–1 to 24–N, respectively, of plates 22, while a second plurality of optical detectors 25–1 to 25–N are arranged to face surfaces 26–1 to 26–N, respectively, of the latter plates. Each of the detectors responds to the intensity (i.e., the square of the amplitude) of incoming optical wave energy. Moreover, each has a response time which is substantially equal to the elongated pulse width T''. Typically photodiodes having the requisite response time can be employed as detectors 23 and detectors 25.

Each pair of detectors associated with one of the plates is coupled to a difference circuit. In particular, detectors 23–1 to 23–N and detectors 25–1 to 25–N are coupled respectively, to difference circuits 27–1 to 27–N. Circuits 27 typically can be conventional two channel sampling oscilloscopes. Alternatively, when $\Delta f$ is sufficiently small, conventional difference amplifiers can be employed. Output ports 17–1 to 17–N of circuits 27–1 to 27–N, respectively, serve as the output ports of detector 15.

Before describing the operation of correlation detector 15, a brief discussion of the basic principles underlying such operation will be presented. It is well known that when two optical waveforms pass over one another traveling in opposite directions, the spatial cross-correlation function generated by the envelopes of the two waveforms can be observed by recording the average or integrated intensity due to the superposition of the waveforms at their points of overlap. The generated correlation function has the property that its spatial width is a function of the reciprocal of the bandwidths of the envelopes of the waveforms and not their duration.

If one of the above waveforms is an optical pulse whose envelope has a duration $T_p$ and bandwidth $\Delta f'$ and the other a train of similar pulses of duration $T_p$, bandwidth $\Delta f'$ and spacing $T_s$, where $T_p > T_s$ (i.e., the pulses of the train overlap and are nonresolvable, in and of themselves), it can be shown that by recording the integrated intensities at the points of overlap of the single pulse with each of the pulses of the train, a spatial pattern of the cross-correlation functions of the envelope of the single pulse and the envelopes of the pulses of the train is generated. The correlation functions are spaced apart a distance $vT_s/2$ and have spatial widths of $v/2\Delta F'$. By selecting $T_s > 1/\Delta f'$, there is no overlap between adjacent correlation functions in the generated pattern. Thus, a train of overlapping otherwise nonresolvable pulses can be used to generate a spatial pattern of nonoverlapping resolvable correlation functions. Since each of the correlation functions corresponds to a specific pulse, resolution of each pulse of the train can be realized by recording its corresponding correlation function or, in particular, a single point, preferably the peak, on its corresponding correlation function.

It should be pointed out that in recording the cross-correlation function as described above, the average energy of the waveforms is also recorded. Thus, in the above-described case of a single pulse and a train of pulses, each of the correlation functions is masked by the background energy of its generating pulses. It can be shown, however, that the aforesaid background energy can be eliminated by subtracting from each recorded value, the value recorded at a point in space where the spatial delay between the two pulses generating the previous value has changed by an amount equal to a half of an optical wavelength or odd multiple thereof, provided, however, that the distance to the point is such that the envelopes of the pulses do not vary substantially over this interval. This result is due to the fact that at spatial positions for which the spatial delays differ in the above-described manner, the values of the background energy are of equal magnitude, while the values of the correlation function are of substantially equal magnitude but of opposite phase.

With the pulse train and single pulse traveling in opposite directions, the spatial delay between them changes by half an optical wavelength at points in space which are separated by a quarter of an optical wavelength. Thus, a single value of each of the above-mentioned correlation functions can be obtained by subtracting from the integrated intensity recorded at a point in space where the function exists, the integrated intensity recorded at a point space $n\lambda/4$ away, where $\lambda$ is the optical wavelength and $n$ is an odd integer which is selected such that the distance $n\lambda/4$ is small (i.e., less than 3 percent) relative to $v/\Delta f'$.

In operation, therefore, detector 15 utilizes pilot pulses 12 and distorted pulse train 13' to generate a spatial pattern of correlation functions for the pulses. Measurement of a point on each of the generated correlation functions is then accomplished by means of the quartz plates, detectors and difference circuits.

More particularly, pilot pulse 12 and pulse train 13' are coupled into detector 15 along axis *a*. The incident pilot pulse 12 propagates through the plates 22 and is reflected backward along axis *a* by mirror 21. As the reflected pilot pulse propagates in the backward direction, it is incident upon surface 26–1 of plate 22–1. The round trip distance $vT'$ traveled by the pilot pulse between surface 26–1 and mirror 21 is such that the pilot pulse arrives at surface 26–1 simultaneously with forward propagating pulse 13–1. Thus, pilot pulse 12 and pulse 13–1 traverse surface 26–1 in opposite directions with zero spatial delay relative to one another.

A small portion of the two pulses simultaneously incident upon surface 26–1 is scattered. A portion of this energy is, in turn, intercepted by detector 25–1. As previously indicated, detector 25–1 has a response time which is substantially equal to T''. As a result, it can be shown that, in response to the scattered energy, the detector develops an output electrical signal which corresponds to the sum of two quantities A and B, where the quantity A is proportional to the sum of the average energy of the pulses 12 and 13–1, and the quantity B is proportional to the peak value of the cross-correlation function of the envelopes of the latter two pulses.

As pilot pulse 12 continues along its backward propagation path, it is next incident upon surface 24–1 of plate 22–1 where a small portion of the pulse is again scattered along with a small portion of pulse 13–1. However, at this surface, the pulses are no longer in phase with each other, their relative delay being equal to $m\lambda/2$. Thus, the energy scattered at surface 24–1 and intercepted by detector 23–1 produces a signal at the detector output corresponding to the sum of the quantities A and (−B). The difference in sign of component B is a result of the delay of $m\lambda/2$ between pulses 12 and 13–1, as explained hereinabove.

It is observed, therefore, that detector 25–1 develops a signal which is proportional to the sum of A and B while detector 23–1 develops a signal which is proportional to the sum of A and (−B). Hence, by subtracting one of the signals from the other, a difference signal directly proportional to the desired quantity B (i.e., to the peak value of the correlation function) is obtained. The required difference signal is generated by coupling the two detector signals to electronic difference circuit 27–1 wherein the signals are algebraically subtracted.

Having passed through plate 22–1, the pilot pulse is incident upon the respective surface 26 (i.e., surface 26–2) of the next successive plate in array 22 (i.e., plate 22–2). Since the spacing between plate 22–1 and 22–2 is equal to $vT/2$, the pilot pulse arrives at surface 26–2 in phase with the next successive pulse in train 13′ (i.e., pulse 13–2) and delayed an amount $m\lambda/2$ relative to pulse 13–2 at surface 24-2. In like fashion, surfaces 24–2 and 26–2 scatter small portions of the energy of the pilot pulses 12 and the signal pulse 13–2, producing an output signal which corresponds to the peak value of the correlation function of these two pulses.

As the pilot pulse propagates through the remaining plates of array 22, electrical signals corresponding to the peak values of the correlation functions of the envelopes of the pilot pulse and the remaining pulses in train 13 are developed in the same manner as hereinabove described. Thus, the peak values of the correlation functions associated with all the pulses are developed sequentially, and appear as output signals of difference circuits 27–1 to 27–N, respectively.

The output signals from the circuits 27 appear at circuit output ports 17–1 to 17–N. Each signal can be observed directly by coupling oscilloscope to its respective port. Alternatively, by sequentially scanning the output ports 17, the signals can be combined in a single wavepath and retransmitted.

Figure 3:
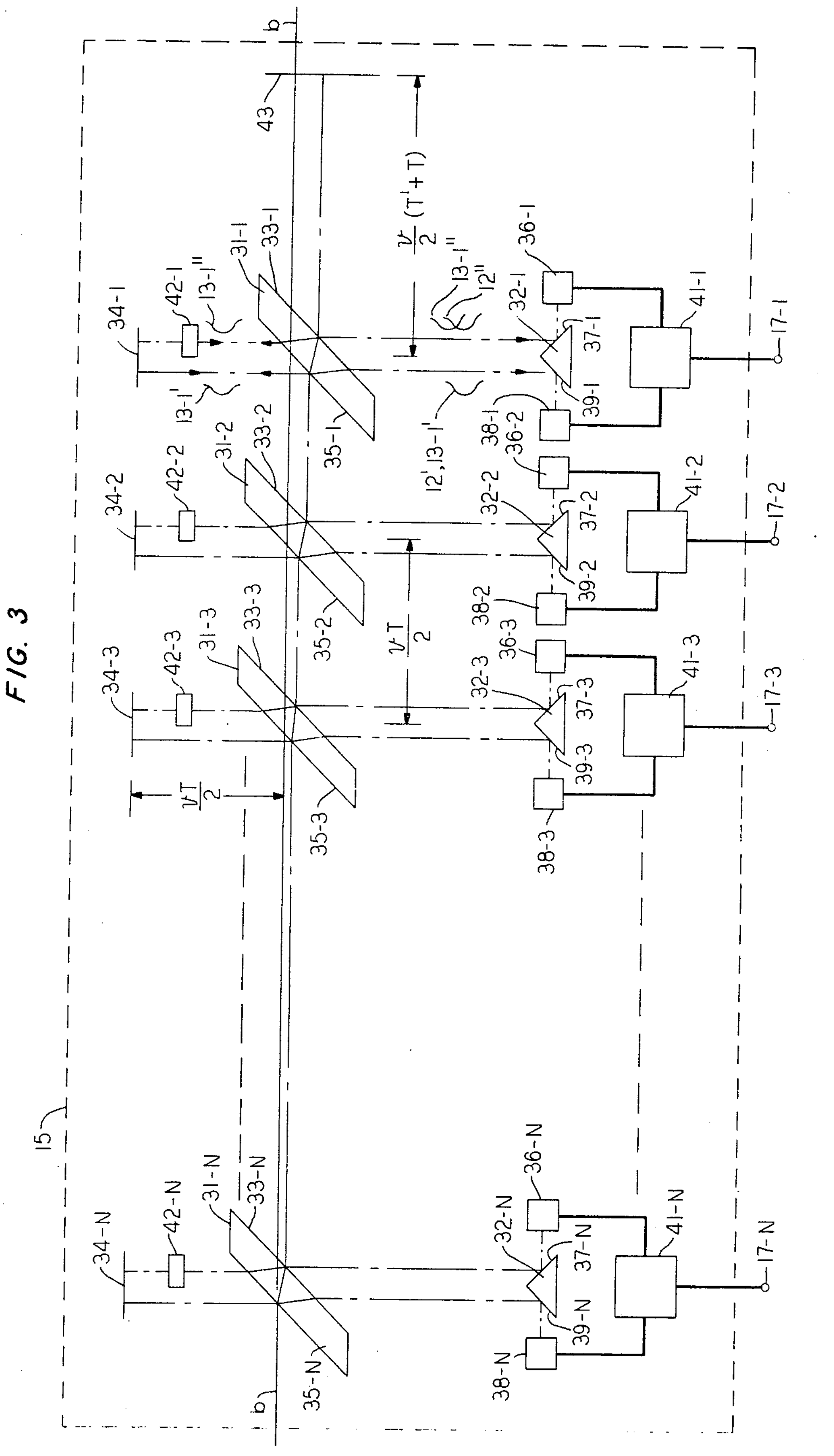
FIG. 3 shows a second embodiment of a correlation detector in accordance with the principles of the instant invention.

In FIG. 3, a second embodiment of correlation detector 15 is illustrated. This embodiment comprises a plurality of quartz plates 31–1 to 31–N which are spaced along a common axis $b$ in front of a mirror 43. Plates 31 are oblique to axis $b$ and have a center to center spacing equal to $vT/2$. The plate closest to mirror 43, i.e., plate 33–1, is positioned along axis b such that its center lies a distance $v(T'+T)/2$ away from mirror 43. Each of the plates has a thickness which is small (i.e., less than 3 percent) relative to $v/\Delta f$. Moreover, the surfaces of each plate are advantageously coated with an antireflection coating. Thus, only a small portion of the optical wave energy incident upon each surface is reflected therefrom.

A plurality of prisms 32–1 to 32–N is arranged below axis $b$ to redirect optical wave energy reflected from or transmitted through surfaces 33–1 to 33–N, respectively, of the plates 31. Similarly, a plurality of mirrors 34–1 to 34–N is disposed above the axis to redirect optical energy reflected from or transmitted through surfaces 35–1 to 35–N, respectively, of the latter plates. Each of the mirrors 31 is spaced a distance $vT/2$ from the axis $b$.

The optical wave energy redirected by prisms 32 is coupled into first and second arrays of detectors 36–1 to 36–N and 38–1 to 38–N. In particular, detectors 36–1 to 36–N collect the wave energy reflected from surfaces 37–1 to 37–N, respectively, of prisms 32, while detectors 38–1 to 38–N collect the wave energy redirected from surfaces 39–1 to 39–N of these prisms. The detectors in arrays 36 and 38 are similar to those in the arrays of FIG. 1. Thus each has a response time substantially equal to T″.

Each pair of detectors associated with one of the plates is coupled to a difference circuit which is similar to the difference circuits of FIG. 1. More specifically, detectors 36–1 to 36–N and detectors 38–1 to 38–N are connected, respectively, to circuits 41–1 to 41–N. The output ports 17–1 to 17–N of difference circuits 41–1 to 41–N, respectively, serve as the output ports of correlation detector 15.

Between each plate 31 and its corresponding mirror of array 34 is an optical delay element. Each of the delay elements 42 is positioned in the path of optical wave energy which is transmitted through surface 35 of its respective plate, after it has been reflected from surface 33 of the plate. Moreover, each delay elements imparts a total spatial delay equal to $k\lambda/2$, where $k$ is an odd integer, to wave energy passing back and forth through the element. Advantageously, $k$ is selected such that the quantity $k\lambda/2$ is small (i.e., less than 3 percent) relative to $v/\Delta f$. Typically, each of the elements 42 can be a quartz plate with parallel flat surfaces, the plate being tilted slightly to give the required delay.

More particularly, pilot pulse 12 and distorted pulse train 13 are coupled into detector 15 along axis $b$. Pilot pulse 12 propagates through plates 31 and is reflected backward towards the latter plates by mirror 43. At substantially the same time that the reflected pilot pulse is a distance $vT$ away from plate 31–1, the first pulse of the train, pulse 13–1, is incident first upon surface 35–1 of plate 31–1 and then upon surface 33–1 of the same plate. At both these surfaces, small portions of pulse 13–1 are reflected toward mirror 34–1. These portions are designated in FIG. 3 as 13–1′ and 13–1″.

The reflected portions of pulse 13–1 propagate along their respective paths toward mirror 34–1 where they are reflected back towards plate 31–1. Since this round trip distance traveled by pulse portion 13–1′ is substantially equal to $vT$, the latter pulse arrives simultaneously with reflected pilot pulse 12 at surface 35–1 of plate 31–1. Pulse 13–1″, on the other hand, since it propagates back and forth through delay element 42–1 in making its round trip, is delayed on amount $k\lambda/2$ relative to the pilot pulse when it arrives at surface 33–1 of the plate.

At surfaces 35–1 and 33-1, small portions of the energy of the backward propagating pilot pulse, designated in FIG. 3 as 12′ and 12″, are reflected in the directions followed by pulses 13–1′ and 13–1 ″, respectively. Thus, as the pilot pulse traverses plate 31–1, two optical signals, one comprising two pulses which are in phase relative to one another (i.e., pulses 13–1′ and 12′), and the other comprising two pulses which are $k$ $\lambda/2$ out-of-phase relative to one another (i.e., pulses 13–1'' and 12'') emanate from surface 33–1 and propagate toward prism 32–1. The signal comprising pulses 12' and 13–1' is incident upon surface 39–1 of the prism and is directed to detector 38–1. The other signal comprising pulses 12'' and 13–1'' is directed by surface 37–1 of prism 32–1 to detector 36–1.

The aforesaid signals received by detectors 38–1 and 36–1 are analogous to the signals received by detectors 25–1 and 23–1, respectively, of FIG. 1. Since, as above-indicated, the detectors have similar operating characteristics, the electrical signals developed by detectors 38–1 and 36–1 are also analogous to those developed by detectors 25–1 and 23–1. Thus, the difference signal generated by coupling the electrical outputs of detectors 38–1 and 36–1 to difference circuit 41–1, is proportional to the peak value of the cross-correlation function of the envelopes of pulses 12 and 13–1.

As pilot pulse 12 continues propagating in the reverse direction through the remaining plates 31, electrical signals corresponding to the peak values of the correlation functions of the pilot pulse and pulses 13–2 to 13–N are sequentially developed by circuits 41–2 to 41–N, respectively, in the same manner as hereinabove described for pulse 13–1.

It should be noted that in both the above-described embodiments of correlation detector 15, each of the information pulses is reflected and propagates backward through the plates of the correlation detector in similar fashion as the pilot pulse. To prevent this backward passage of the information pulses from causing the generation of unwanted signals, the square law detectors associated with each plate can be gated such that they remain on only during the time the reflected pilot pulse is traversing their respective plate. Alternatively, the square law detectors can remain in an on condition and their associated difference circuit gated.

It is to be understood that the embodiments described herein are merely illustrative, and that numerous and varied other arrangements can readily be devised in accordance with the teachings of the present invention without departing from the spirit and scope of the invention. In particular, while the invention has been described in terms of optical wave energy, the principles of the invention equal applicable to systems employing other types of wave energy. For example, in a system employing microwave energy a correlation detector can be constructed by substituting analogous microwave components for the optical components employed in the embodiments of detector 15 depicted in FIGS. 2 and 3. Moreover, while the pulses of train 13' have been described as having equal amplitudes they could just as well have been coded pulses having different amplitudes.

What is claimed is:

1. In an optical system wherein an optical pilot pulse and a train of overlapping information pulses are propagating, correlation means for resolving said overlapping information pulses comprising:

means for generating a plurality of signal pairs, where each of said signal pairs is developed from said pilot pulse and a different information pulse of said train;

the two signals of any one pair being proportional to the sum and difference, respectively, of the average energy of the pilot pulse and an information pulse, and a value on the cross-correlation function of the latter two pulses;

and means for forming a plurality of difference signals, each of which is proportional to the algebraic difference between the two signals of each of said signal pairs.

2. A correlation means in accordance with claim 1 wherein the time delay between adjacent information pulses is greater than the reciprocal of the information pulse bandwidth.

3. An optical transmission system comprising:

means for generating a train of optical pulses comprising an optical pilot pulse followed by a train of information pulses;

a dispersive optical transmission medium into which said pulses are coupled;

and optical correlation means coupled to the output end of said medium for resolving said information pulses comprising:

means for generating a plurality of signal pairs, where each of said signal pairs is developed from said pilot pulse and a different information pulse of said train;

the two signals of any one pair being proportional to the sum and difference, respectively, of the average energy of the pilot pulse and an information pulse, and a value on the cross-correlation function of the latter two pulses;

and means for forming a plurality of difference signals, each of which is proportional to the algebraic difference between the two signals of said signal pairs.

4. An optical transmission system in accordance with claim 3 wherein said means for forming a plurality of signal pairs comprises:

a plurality of plates longitudinally distributed along the propagation direction of said pulses;

each of said plates having a thickness equal to $m\lambda/4$, and each being separated in space from the next adjacent plate by an amount $vT/2$, where $\lambda$ is the optical wavelength, $m$ is an odd integer, $v$ is the velocity of the pulses and $T$ is the center to center spacing between adjacent information pulses;

a mirror facing a surface of the last of said plurality of plates, said mirror being disposed a distance $vT'/2$ from said surface, where T' is the time delay between said pilot pulse and said first information pulse;

and means disposed on opposite sides of each of said plates for intercepting the optical wave energy scattered therefrom.

5. An optical transmission system in accordance with claim 4 wherein said means disposed on opposite sides of each plate comprises an optical square law detector which develops an electrical signal proportional to the intensity of the received optical wave energy.

6. An optical transmission system in accordance with claim 5 wherein said square law detectors have response times which are equal to the broadened width of the information pulses after they have propagated through said dispersive medium.

7. An optical transmission system in accordance with claim 3 wherein said means for forming a plurality of difference signals comprises a plurality of difference amplifiers.

8. An optical transmission system in accordance with claim 3 wherein said means for generating a plurality of signal pairs comprises:

a plurality of optical plates distributed, at intervals of $vT/2$, along the propagation path of said pulses;

each of said plates being inclined to said propagation path of said pulses, and each having a first surface for reflecting a first component of an incident information pulse along a first path and a second surface for reflecting a second component of the same information pulse along a second path;

a plurality of mirrors, each of which is displaced a distance $vT/2$ from the propagation path of said pulses, and disposed such that it redirects the first and second components reflected by a different one of said plates back through said one plate and along third and fourth paths, respectively;

a plurality of delay elements for imparting a delay of $m\lambda/2$ to optical wave energy passing back and forth therethrough, where each of said delay elements lies along a different one of said second paths;

a mirror disposed along said propagation path of said pulses, at a distance $v(T'+T)/2$ away from the last plate of said plurality, for redirecting said pilot pulse back through said plates;

each of said plates reflecting first and second components of said redirected pilot pulse, as it passes therethrough, along the third and fourth paths, respectively, associated with each plate;

and means for intercepting the optical wave energy propagating along the third and fourth paths associated with each plate.

9. An optical transmission system in accordance with claim 8, wherein the means for intercepting the optical wave energy propagating along the third and fourth paths associated with each plate comprises:

a prism arranged such that two of its surfaces lie along said third and fourth paths, respectively;

and two optical square law detectors, each disposed opposite to one of said two surfaces for receiving the optical wave energy reflected therefrom.

10. An optical transmission system in accordance with claim 9 wherein said square law detectors are gated to remain on only during the time and redirected pilot pulse is traversing their respective plate.

11. A method of resolving optical information pulses comprising the steps of:

generating an optical signal comprising an optical pilot pulse followed by a train of optical information pulses;

transmitting said optical signal through a dispersive optical transmission medium, whereby said pilot pulse and said information pulses are expanded in width thereby causing said information pulses to overlap;

forming a first plurality of signals equal to the number of information pulses, where each of said signals is proportional to the sum of two quantities, both of which quantities are formed by the widened pilot pulse and the same widened information pulse, and where the first of said quantities is proportional to the energy content of the widened pilot pulse and a different widened information pulse, and the second of said quantities is proportional to a point on the cross-correlation function of the widened pilot pulse and said different widened information pulse;

forming a second plurality of signals, each of which is proportional to the difference between the two quantities forming a different one of said first signals;

and forming a plurality of different signals, each of which is proportional to the difference between the first and second signals formed from the same two quantities.

* * * * *